United States Patent
Slowik et al.

(10) Patent No.: US 10,417,468 B2
(45) Date of Patent: Sep. 17, 2019

(54) SYSTEM FOR, AND METHOD OF, DETECTING THE PRESENCE OF A MOBILE COMMUNICATION DEVICE IN PROXIMITY TO AN IMAGING READER, AND FOR AUTOMATICALLY CONFIGURING THE READER TO READ AN ELECTRONIC CODE DISPLAYED ON THE DEVICE UPON SUCH DETECTION (71) Applicant: SYMBOL TECHNOLOGIES, LLC, Lincolnshire, IL (US)

(72) Inventors: Joseph S. Slowik, Bellport, NY (US); Charles Torzilli, East Northport, NY (US)

(73) Assignee: Symbol Technologies, LLC, Holtsville, NY (US)

(*) Notice: Subject to any disclaimer, the term of this patent is extended or adjusted under 35 U.S.C. 154(b) by 0 days.

(21) Appl. No.: 15/987,209

(22) Filed: May 23, 2018

(65) Prior Publication Data
US 2018/0268181 A1 Sep. 20, 2018

Related U.S. Application Data (63) Continuation of application No. 14/319,574, filed on Jun. 30, 2014, now Pat. No. 10,025,963.

(51) Int. Cl.
G06K 7/10 (2006.01)
(52) U.S. Cl.
CPC ....... G06K 7/10732 (2013.01); G06K 7/1095 (2013.01); G06K 7/10752 (2013.01)

(58) Field of Classification Search
CPC .......... G06K 7/10732; G06K 7/10722; G06K 7/1095; G06K 7/10752; G09F 19/22; G09F 19/228; H04L 67/18
(Continued)

(56) References Cited

U.S. PATENT DOCUMENTS 6,490,455 B1 12/2002 Park et al.
7,628,318 B2 12/2009 Melick et al.
(Continued)

FOREIGN PATENT DOCUMENTS

WO 2006/098955 A2 9/2006
WO 2010/017138 A1 2/2010
(Continued)

OTHER PUBLICATIONS

International Search Report and Written Opinion for International Patent Application No. PCT/US2015/036156 dated Sep. 8, 2015.

Primary Examiner — Thien M Le
Assistant Examiner — Tae W Kim
(74) Attorney, Agent, or Firm — Yuri Astvatsaturov (57) ABSTRACT A printed code associated with a product is illuminated with light having a first lighting characteristic, and is readable in a default mode of an imaging reader. An electronic code displayed on a mobile communication device is readable in another mode of the reader, with a different second lighting characteristic that is designed to minimize specular reflection from a screen of the device. When the presence of the device in close proximity to the reader is detected, the reader is automatically configured to switch from the default mode to the other mode to enable the electronic code to be read.

5 Claims, 6 Drawing Sheets (58) Field of Classification Search
 USPC .......................................................... 235/455
 See application file for complete search history.

(56) References Cited

U.S. PATENT DOCUMENTS

| | | |
|---|---|---|
| 8,391,839 B2 | 3/2013 | Kantola et al. |
| 8,638,363 B2 | 1/2014 | King et al. |
| 8,718,536 B2 | 5/2014 | Hannon |
| 2004/0035925 A1 | 2/2004 | Wu et al. |
| 2004/0184031 A1* | 9/2004 | Vook .................... G06T 7/0002 356/237.1 |
| 2008/0292079 A1 | 11/2008 | Toutain et al. |
| 2009/0066509 A1 | 3/2009 | Jernstrom et al. |
| 2012/0067956 A1* | 3/2012 | Gao .................... G06K 7/10792 235/455 |
| 2012/0286936 A1* | 11/2012 | Mullen .................. G06Q 10/00 340/10.2 |
| 2013/0062412 A1 | 3/2013 | Tan et al. |
| 2013/0150004 A1* | 6/2013 | Rosen .................... H04W 8/22 455/414.1 |
| 2013/0181055 A1 | 7/2013 | Liu et al. |
| 2014/0015639 A1 | 1/2014 | Antoine et al. |
| 2014/0114780 A1 | 4/2014 | Menefee et al. |
| 2015/0048164 A1 | 2/2015 | Slutsky |

FOREIGN PATENT DOCUMENTS

| | | |
|---|---|---|
| WO | 2010/115604 A2 | 10/2010 |
| WO | 2012/036882 A1 | 3/2012 |

* cited by examiner

SYSTEM FOR, AND METHOD OF, DETECTING THE PRESENCE OF A MOBILE COMMUNICATION DEVICE IN PROXIMITY TO AN IMAGING READER, AND FOR AUTOMATICALLY CONFIGURING THE READER TO READ AN ELECTRONIC CODE DISPLAYED ON THE DEVICE UPON SUCH DETECTION

CROSS-REFERENCE TO RELATE APPLICATIONS

This application is a continuation of U.S. patent application Ser. No. 14/319,574 filed on Jun. 30, 2014 which is incorporated herein by reference in its entirety.

BACKGROUND OF THE INVENTION

The present invention relates generally to a system for, and a method of, electro-optically reading a printed code associated with a product, and an electronic code displayed on a mobile communication device, and, more particularly, to detecting the presence of the device, such as a smartphone, in close proximity to an imaging reader, and for automatically configuring the reader to read the electronic code upon such detection.

Solid-state imaging systems or imaging readers have been used, in both handheld and/or hands-free modes of operation, to electro-optically read targets, such as one- and two-dimensional bar code symbols, and/or non-symbols, such as documents, over a range of working distances relative to each reader. An imaging reader includes a housing for supporting an imaging module, also known as a scan engine. In a hands-free mode, such as at a fixed position kiosk or at a stationary, point-of-transaction workstation, the imaging module is mounted in a housing having at least one window to which products associated with, e.g., bearing, the symbols to be read are either presented, or across which the symbols are swiped. The workstation may have a single, horizontal or upright, window as in a flat-bed or slot-scanner workstation, or a pair of horizontal and upright windows as in a bi-optical workstation, and be located at a countertop of a checkout stand in supermarkets, warehouse clubs, department stores, and other kinds of retailers, as well as at other kinds of businesses, such as libraries and factories.

The imaging module includes an imaging assembly having a solid-state imager or imaging sensor with an array of photocells or light sensors, which correspond to image elements or pixels in an imaging field of view of the imager, and an imaging lens assembly for capturing return light scattered and/or reflected from the symbol being imaged over a range of working distances relative to the module, and for projecting the return light onto the array to initiate capture of an image of each symbol. Such an imager may include a one- or two-dimensional charge coupled device (CCD) or a complementary metal oxide semiconductor (CMOS) device, with global or rolling exposure shutters, and associated circuits for producing and processing electrical signals corresponding to a one- or two-dimensional array of pixel data over the imaging field of view. In order to increase the amount of the return light captured by the array, for example, in dimly lit environments or for far-out symbols located relatively far from the window, the imaging module generally also includes an illuminating light assembly for illuminating the symbol with illumination light over an illumination field for reflection and scattering from the symbol.

Each symbol is typically printed with ink on such media as paper, foil or film labels that are directly applied to the products, or on such media as paper, foil or film packaging that cover and contain the products, or directly on membership or customer loyalty cards, coupons, and drivers' licenses that are carried by customers remotely from the products. In recent years, it has become increasingly advantageous to display symbols on information display screens, such as display screens of wireless telephones ("cellphones" or "smartphones"), personal digital assistants ("PDAs"), and like mobile communication devices, such as e-readers, portable tablets, slates, wearable glasses or watches, and computers. Displaying such symbols, also known as "electronic codes", on such display screens has become increasingly desirable at such venues as airports and theaters, because they relieve consumers from needing to carry symbol-coded, paper tickets, coupons, and cards.

Although generally satisfactory for their intended purpose of reading printed codes, some of the known imaging readers have not proven to be altogether satisfactory when reading the above-described electronic codes due to specular reflection of the illumination light off the display screens. Display screens can be reflective, i.e., they alter their reflectivity to ambient light to form an image, typically from light and dark pixels, such as passive black and white liquid crystal displays ("LCDs"), or can be emissive, such as backlit LCDs, i.e., they internally generate the light emitted therefrom. Whether reflective or emissive, each display screen includes a glass pane or cover, and the electronic code is displayed behind the glass pane. A portion of the illumination light incident on the glass pane is reflected therefrom back into the imaging field of view of the imager. This reflected portion of the illumination light creates undesirable one or more hot spots in the imaging field of view that at least partially and locally blinds the imager, and may significantly compromise reading performance. If the electronic code cannot be successfully read in an initial attempt, the scan engine typically tries again and again. Often, the reading fails, and the user must take additional time to manually enter the data that would have otherwise been automatically read and entered into the imaging reader.

Accordingly, there is a need to efficiently, rapidly and reliably read electronic codes, and to generally improve overall reading performance of such imaging readers when reading electronic codes.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure relates to a system for electro-optically reading a printed code, e.g., a one- or two-dimensional bar code symbol, associated with a product, and for electro-optically reading an electronic code displayed on a mobile communication device, such as a cellphone or a smartphone. The system comprises an imaging reader including a housing, a light-transmissive window supported by the housing, an imaging assembly supported by the housing and having a solid-state imager with an array of image sensors, e.g., a one- or two-dimensional charge coupled device (CCD) or a complementary metal oxide semiconductor (CMOS) device, with global or rolling exposure shutters, and an imaging lens assembly, and an illuminating light assembly supported by the housing. A controller is operative, in a first mode of operation of the reader, for controlling the illuminating light assembly to illuminate the printed code with illumination light having a first lighting characteristic, for controlling the imaging assembly to capture illumination light returned from the illuminated printed code through the window over a field of view and to project the captured illumination light from the illuminated printed code onto the array, and for processing the captured illumination light from the illuminated printed code.

A device detector detects when the mobile communication device is proximal to the window by sensing a radio frequency (RF) signal radiated from the mobile communication device, and generates a mode control signal when the sensed RF signal exceeds a threshold value. Preferably, the device detector includes an antenna supported by the housing, and operative for receiving the RF signal radiated from the mobile communication device when the latter is searching for a wireless connection.

The controller is operative, in response to receipt of the mode control signal, for automatically configuring the reader to switch to a second mode of operation in which the controller controls the illuminating light assembly to change the illumination light from a first lighting characteristic to a second lighting characteristic, controls the imaging assembly to capture return light from the electronic code through the window over a field of view and to project the captured return light from the electronic code onto the array, and processes the captured return light from the electronic code. The second lighting characteristic is different from the first lighting characteristic to minimize specular reflection from the mobile communication device from compromising reading of the electronic code.

If the imager has a global shutter for simultaneously exposing all the image sensors over exposure times in successive frames, then the controller energizes the illuminating light assembly to emit the illumination light as pulses over pulse times in successive frames, synchronizes each exposure time with each pulse time in each frame for the first lighting characteristic, and timewise shifts each pulse time with each exposure time in each frame for the second lighting characteristic. Advantageously, each pulse time does not overlap each exposure time for the second lighting characteristic.

If the imager has a rolling shutter for sequentially exposing all the image sensors in successive rows or columns over successive exposure times, then the controller energizes the illuminating light assembly to emit the illumination light as a train of pulses over successive pulse times, synchronizes one of the pulse times to overlap one of the exposure times for the first lighting characteristic in the first mode, and timewise shifts each pulse time with each exposure time for the second lighting characteristic in the second mode. Advantageously, each pulse time partially overlaps each exposure time for the second lighting characteristic.

Another aspect of the present disclosure relates to a method of electro-optically reading a printed code associated with a product, and of electro-optically reading an electronic code displayed on a mobile communication device. The method is performed by controlling, in a first mode of operation of an imaging reader having a light-transmissive window, an illuminating light assembly to illuminate a printed code with illumination light having a first lighting characteristic, and controlling an imaging assembly having a solid-state imager with an array of image sensors to capture illumination light returned from the illuminated printed code through the window over a field of view and to project the captured illumination light from the illuminated printed code onto the array, and processing the captured illumination light from the illuminated printed code. The method is further performed by detecting when the mobile communication device is proximal to the window by sensing a radio frequency (RF) signal radiated from the mobile communication device, and generating a mode control signal when the sensed RF signal exceeds a threshold value. The method is still further performed by automatically configuring the reader, in response to generation of the mode control signal, to switch to a second mode of operation in which the illumination light from illuminating light assembly is changed from a first lighting characteristic to a second lighting characteristic, in which return light from the electronic code is captured by the imaging assembly through the window over a field of view and is projected onto the array, and in which the captured return light from the electronic code is processed. The second lighting characteristic is configured to be different from the first lighting characteristic to minimize specular reflection from the mobile communication device from compromising reading of the electronic code.

Figure 1:
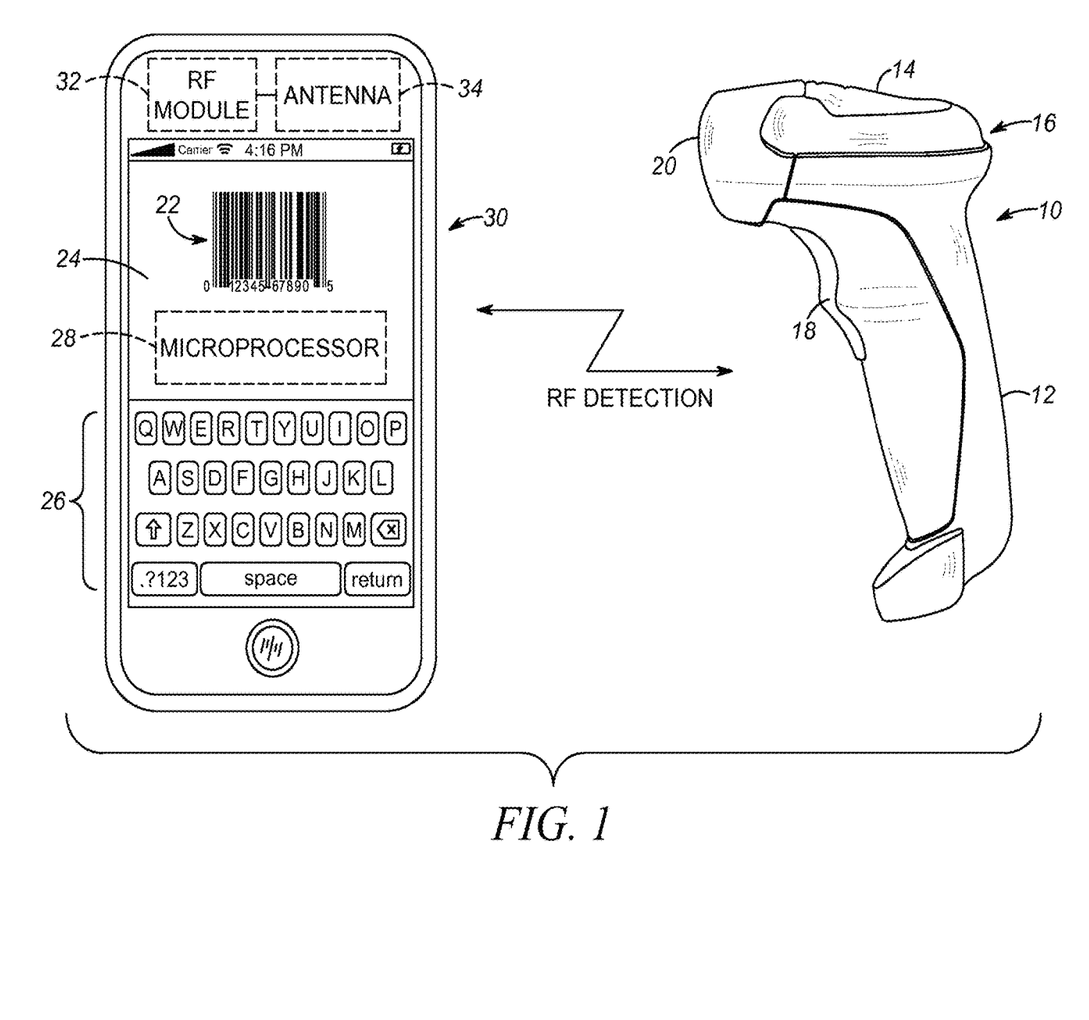
FIG. 1 is a view of a system for detecting the presence of a mobile communication device in close proximity to an imaging reader, and for automatically configuring the reader to read an electronic code displayed on the device, in accordance with the present invention.

Reference numeral 10 in FIG. 1 generally identifies a mobile, handheld reader for electro-optically reading targets by image capture. As illustrated, the imaging reader 10 has a lower handle 12 to be gripped in a user's hand, and an upper barrel 14 arranged in a gun-shaped housing 16 having a trigger 18 that is manually depressed by the user's forefinger to initiate reading of a target, such as a one- or two-dimensional symbol associated with a product, or an electronic code 22 displayed on a screen 24 of a mobile communication device 30. A light-transmissive window 20 (best seen in FIG. 2) is mounted on the housing 16 at the front end region of the barrel 14. The reader 10 can thus be used in a handheld mode in which the reader 10 is aimed at a target to be read, followed by depression of the trigger 18 to initiate reading.

Although FIG. 1 depicts a gun-shaped reader 10, this is merely exemplary, because it will be understood that many other reader configurations may be employed in the practice of the invention disclosed herein. For example, the reader may alternatively be configured as a stationary workstation, such as a vertical slot scanner having a generally upright window, or as a horizontal slot scanner having a generally horizontal window, or as a bioptical workstation having both a generally horizontal window and a generally upright window. The workstation may be used in many diverse environments. In these stationary workstations, the targets are slid, swiped past, or presented to, a window on the workstation in a hands-free mode of operation.

Figure 3:
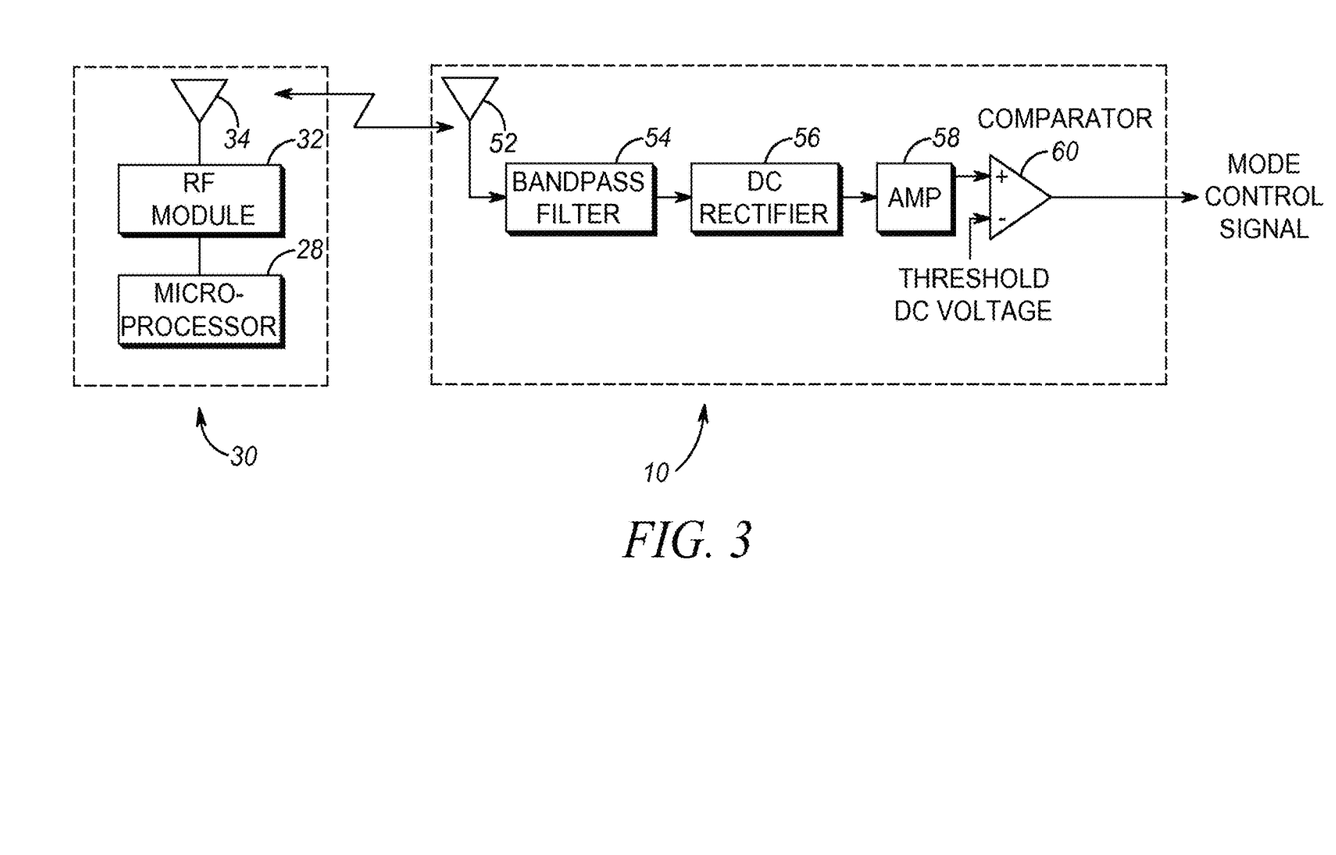
FIG. 3 is an electrical schematic depicting system components for detecting the presence of the mobile communication device in close proximity to the imaging reader in the system of FIG. 1.

The mobile communication device 30 in FIG. 1 is depicted as a cellphone or smartphone, but it could equally well be a different device, such as a personal digital assistant ("PDA"), an e-reader, a tablet, a slate, a pair of wearable glasses, a watch, or a portable computer. The device 30 has, among other things, an electronic keyboard 26, and, as best seen in FIG. 3, a microprocessor 28, a radio frequency (RF) module 32, and an RF antenna 34, as described below. The illustrated electronic code 22 is a one-dimensional symbol, but it could equally well be a two-dimensional symbol.

Figure 2:
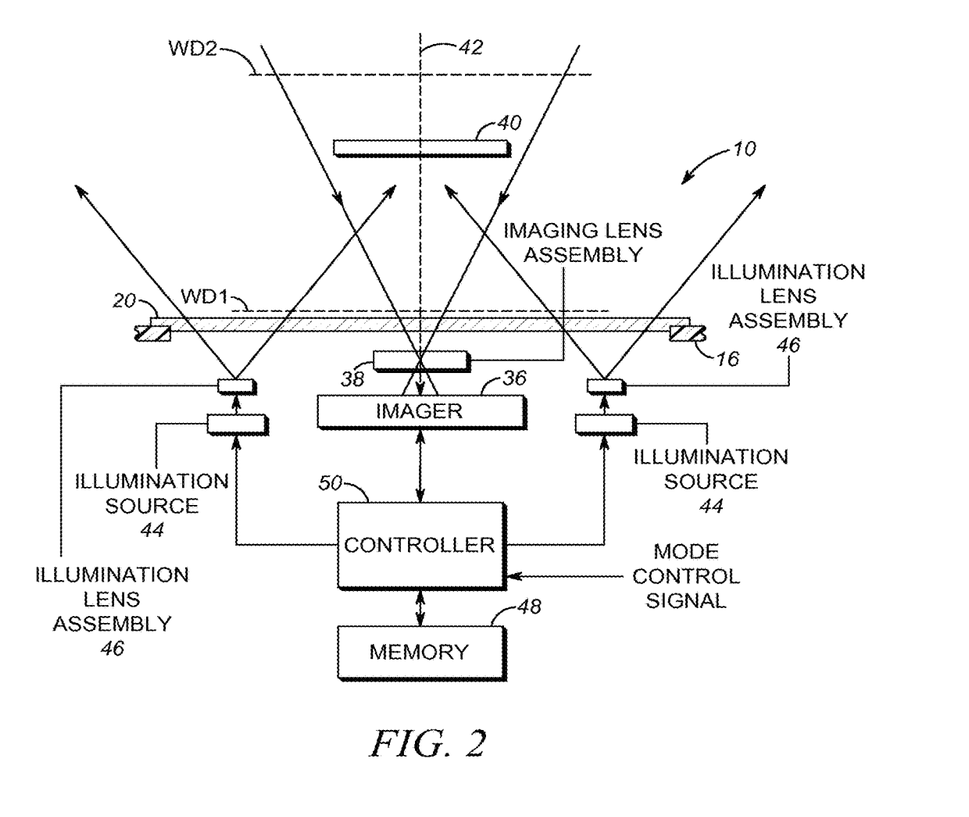
FIG. 2 is a diagrammatic view depicting system components for configuring the reader to read a printed code associated with a product, and the electronic code displayed on the device in the system of FIG. 1.

FIG. 2 schematically depicts an imaging assembly or scan engine mounted in the reader 10 behind the window 20. The imaging assembly includes a solid-state, imager or image sensor 36, and an imaging lens assembly 38, which may have one or more imaging lenses, such as a Cooke triplet. The imager 36 has an array of pixels or light sensors and may be a one- or two-dimensional charge coupled device (CCD) or a complementary metal oxide semiconductor (CMOS) device, having either a global or a rolling exposure shutter, and is analogous to the imagers used in electronic digital cameras. The imager 36 and the lens assembly 38 are together operative for capturing return light scattered and/or reflected from a target 40 to be read by image capture over a field of view along an optical path or axis 42 through the window 20 and over a range of working distances between a close-in working distance (WD1) and a far-out working distance (WD2). In a preferred embodiment, WD1 is either at, or about a half inch away from, the window 26, and WD2 can be many feet from the window 26, although other numerical values are contemplated. The target 40 may either be a printed code associated with a product, or the electronic code 22 displayed on the device 30. As described below, the imager 36 may have a global shutter in which all the image sensors are simultaneously exposed in successive frames, or a rolling shutter in which all the image sensors are sequentially exposed in successive rows or columns.

The reader 10 also supports an energizable illuminating light assembly for illuminating the target with illumination light from an illumination light source when energized. The illuminating light assembly includes, as illustrated, a pair of illumination light sources or light emitting diodes (LEDs) 44, and a corresponding pair of illumination lens assemblies 46 to uniformly illuminate the target 40 with illumination light when energized. The illumination LEDs 44 and the illumination lens assemblies 46 are preferably symmetrically located at opposite sides of the imager 36. A controller or control circuit 50 controls operation of the electrical components of the assemblies, processes the captured return light from the target as a image, and decodes the captured image. A memory 48 is connected, and accessible, to the controller 50.

As previously described, the reader 10 is very satisfactory for reading a printed code, but is less satisfactory when reading the electronic code 22 due to specular reflection of the illumination light off the display screen 24. A portion of the illumination light incident on the display screen 24 is reflected therefrom back into the imaging field of view of the imager 36. This reflected portion of the illumination light creates undesirable one or more hot spots in the imaging field of view that at least partially and locally blinds the imager 36, and may significantly compromise reading performance. If the electronic code 22 cannot be successfully read in an initial attempt, the scan engine typically tries again and again, thus rendering the performance as sluggish.

To minimize, if not eliminate, the specular reflection problem associated with electronic codes and to expedite the reading of electronic codes, it is proposed to change the lighting characteristic of the illumination light when reading electronic codes. Thus, in a first mode of operation, the controller 50 energizes the illuminating light assembly to emit the illumination light to illuminate the printed code with a first lighting characteristic, and thereupon, the controller 50 processes the captured return light from the printed code to read the printed code by image capture with the first lighting characteristic. In a second mode of operation, the controller 50 configures the illuminating light assembly to have a different second lighting characteristic, and thereupon, the controller 50 processes the captured return light from the electronic code 22 to read the electronic code 22 by image capture with the second lighting characteristic. The difference between the first and second lighting characteristics is dependent on whether the imager 36 has a global exposure shutter or a rolling exposure shutter, as described below.

The change in the lighting characteristics of the illumination light is initiated by a device detector in the reader 10 for detecting when the mobile communication device 30 is proximal to the window 20 by sensing a radio frequency (RF) signal radiated from the mobile communication device 30, typically when the device is searching for a wireless connection, and for generating a mode control signal when the sensed RF signal exceeds a threshold value. The controller 50 automatically switches from the first lighting characteristic to the second lighting characteristic in response to receipt of the mode control signal.

As best seen in FIG. 3, the device detector includes an antenna 52 for receiving the RF signal radiated from the antenna 34 of the mobile communication device 30 when the latter is searching for a wireless connection, a frequency bandpass filter 54 for filtering the received RF signal, preferably in the frequency band of 0.7 to 2.7 GHz, a rectifier 56 for rectifying the filtered RF signal to a DC voltage, an optional amplifier 58 with a fixed gain for amplifying the rectified RF signal, and a comparator 60 for comparing the DC voltage to a reference DC voltage constituting the threshold value. When the DC voltage exceeds the reference DC voltage, the mode control signal is generated, and sent to the controller 50 (see FIG. 2).

The search for the wireless connection by a smartphone or a cellphone is periodically, and typically constantly, performed by the microprocessor 28 controlling the RF module 32 to send out from the antenna 34 short RF signals or "pings" as the phone searches for a Wi-Fi or a cellular network nearby. These pings include the phone's MAC address (a unique identifier associated with a specific device) and other non-personal information like RF signal strength that is used to determine rough location of the phone. The phone also sends out RF signals when connecting to a Bluetooth device, or a near field communication (NFC) device. The frequency of these RF signals generally lies in the band of the bandpass filter 54. The antenna 52 of the detector receives these pings, and generates the mode control signal when the mobile communication device 30 is located in a near range of working distances away from the window 20. The near range extends from the window 20 to about ten inches therefrom in a preferred embodiment.

Figure 4:
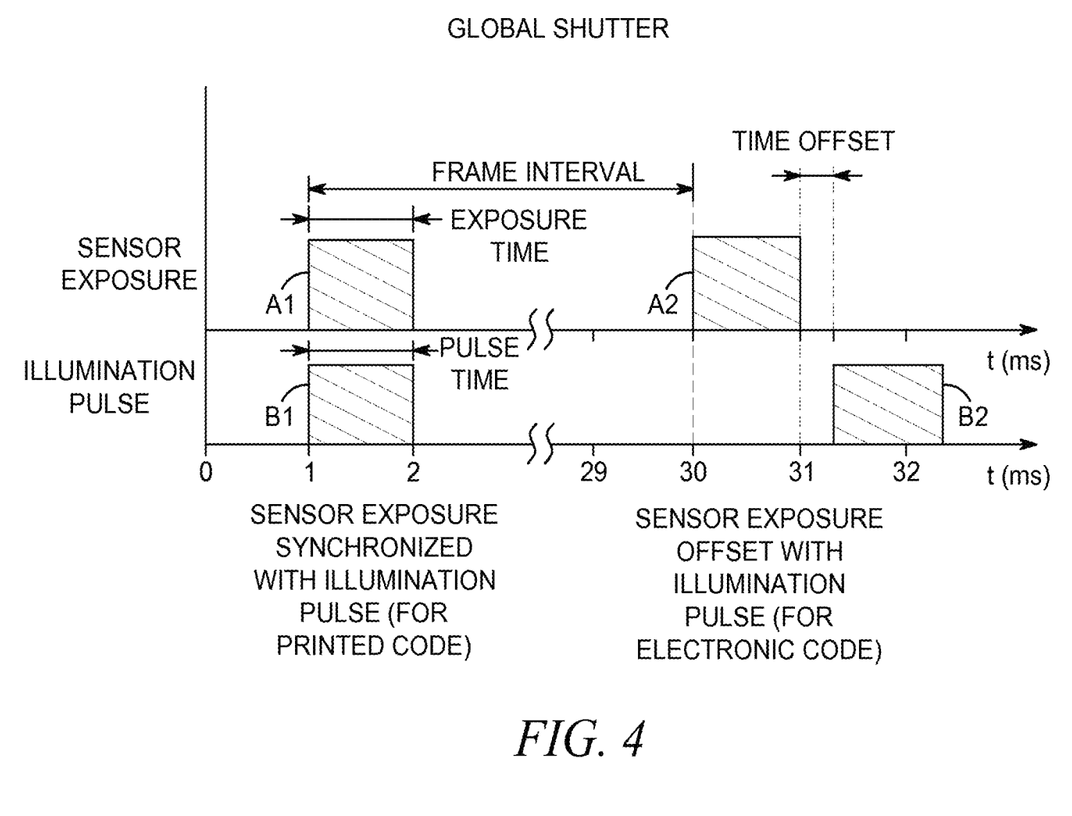
FIG. 4 is a timing diagram depicting system operation for an imager having a global shutter during reading of both printed and electronic codes in accordance with one embodiment of this invention.

As previously mentioned, when the imager 36 uses a global shutter in which all the image sensors are simultaneously exposed over exposure times in successive frames, then the controller 50 energizes the illumination LEDs 44 to emit the illumination light as pulses over pulse times in the successive frames. A typical imager needs about 16-33 milliseconds to read the entire target image and operates at a frame rate of about 30-60 frames per second. As shown in FIG. 4, the exposure times, as represented by pulses A1 and A2, each have a duration of 1 millisecond, and the frame interval is 30 milliseconds, there being one exposure time per frame. Each illumination pulse, as represented by pulses B1 and B2, has a pulse time of 1 millisecond, there being one pulse time per frame. When reading the printed code, the controller 50 synchronizes each exposure time with each pulse time in each frame. Thus, as shown on the left side of FIG. 4, the pulses A1 and B1 overlap in time. When reading the electronic code 22, the controller 50 timewise shifts each pulse time with each exposure time in each frame. Thus, as shown on the right side of FIG. 4, the pulses A2 and B2 are offset in time. Put another way, when reading the electronic code 22, the illumination pulse B2 is not generated while the imager 36 is being exposed. Thus, the illumination pulse B2 does not create any hot spots that could blind and interfere with the imager 36.

Figure 5:
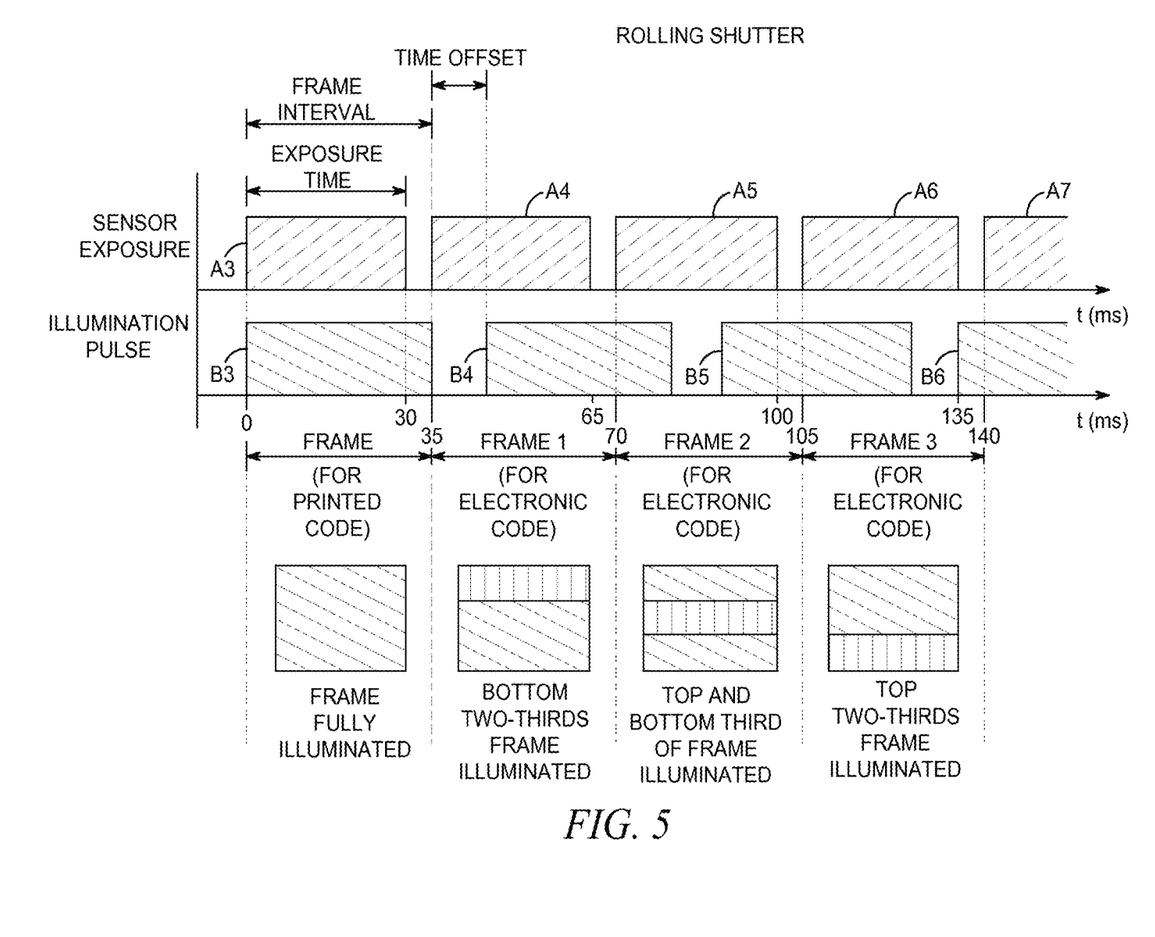
FIG. 5 is a timing diagram depicting system operation for an imager having a rolling shutter during reading of both printed and electronic codes in accordance with another embodiment of this invention.

As also previously mentioned, when the imager 36 uses a rolling shutter in which the image sensors, which are arranged in mutually orthogonal rows and columns, are sequentially exposed over exposure times in successive rows or columns, then the controller 50 energizes the illumination LEDs 44 to emit the illumination light as a train of pulses over pulse over successive pulse times. As shown in FIG. 5, the exposure times, as represented by pulses A3, A4, A5, A6 and A7, each have a duration of 30 milliseconds, and the frame interval is 35 milliseconds, there being one exposure time per frame. Each illumination pulse, as represented by pulses B3, B4, B5 and B6, has a pulse time of 35 milliseconds. When reading the printed code, the controller 50 synchronizes one of the pulse times B3 to overlap, and extend past, one of the exposure times A3, as shown on the left side of FIG. 5. This insures that the printed code is fully illuminated for the entire exposure time.

When reading the electronic code 22 with the rolling shutter, the controller 50 timewise shifts each pulse time with each exposure time. Thus, as shown in FIG. 5, the pulses A4 and B4 are offset in time, as are the pulses A5 and B5, as are the pulses A6 and B6, etc. Each pulse time partially overlaps each exposure time. Thus, in frame 1, a leading part of the pulse B4 overlaps two-thirds of the pulse A4, so that only the bottom two-thirds of the rows or columns of the array are exposed; in frame 2, a trailing part of the pulse B4 and a leading part of the pulse B5 overlap the leading and trailing third of the pulse A5, so that only the top and the bottom thirds of the rows or columns of the array are exposed; and in frame 3, a trailing part of the pulse B5 overlaps two-thirds of the pulse A6, so that only the top two-thirds of the rows or columns of the array are exposed; and so on.

Figure 6:
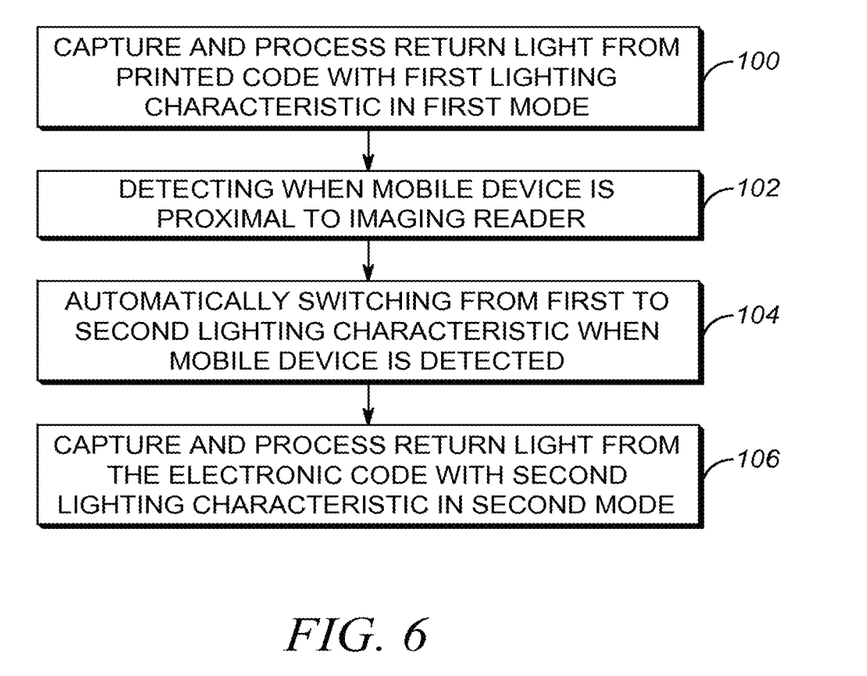
FIG. 6 is a flow chart depicting steps performed in a method of detecting the presence of the mobile communication device in close proximity to the imaging reader, and for automatically configuring the reader to read the electronic code displayed on the device, in accordance with the present invention.

Turning now to the flow chart of FIG. 6, a method of reading a printed code and an electronic code is performed by capturing and processing return light from the printed code illuminated with a first lighting characteristic in a first or default mode of operation of the imaging reader 10 in step 100. When the device 30 is detected in close proximity to the reader 10 in step 102, a mode control signal is generated, which, in turn, signals the controller 50 to configure the reader 10 to transition to a second mode of operation in which the lighting characteristic has been changed to a second lighting characteristic in step 104. In the second mode, return light from the electronic code is captured and processed in step 106. The second lighting characteristic is designed to minimize, if not eliminate, the specular reflection problem that occurs when reading the electronic code. Thus, the reader 10 has an accelerated, aggressive reading performance, because the system recognizes that an electronic code is desired to be read when the near presence of the device 30 is detected.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A system for electro-optically reading a printed code associated with a product, and for electro-optically reading an electronic code displayed on a mobile communication device, the system comprising:

an imaging reader including a housing, a light-transmissive window supported by the housing, an imaging assembly supported by the housing and having a solid-state imager with an array of image sensors and an imaging lens assembly, and an illuminating light assembly supported by the housing;

a device detector to detect without relying upon Near-field communication (NFC) when a mobile communication device is proximal to the window by sensing a radio frequency (RF) signal radiated from the mobile communication device in a frequency band of 0.7 to 2.7 GHz, and to generate a mode control signal when the RF signal exceeds a threshold value; and a controller operative to:
control the illuminating light assembly to illuminate the printed code with illumination light having a first lighting characteristic;
control the imaging assembly to capture a first image through the window over a field of view, the first image including an image of the printed code, the first image being captured over a first-image frame; and
process the first image, the controller, in response to receipt of the mode control signal, configuring the imaging reader to operate in a second mode of operation where the controller is further operative to:
control the illuminating light assembly to change the illumination light from the first lighting characteristic to a second lighting characteristic;
control the imaging assembly to capture a plurality of second images of an environment through the window over the field of view, each of the plurality of second images including the electronic code, each of the plurality of second images being captured over a respective second-image frame; and
process the plurality of second images, wherein the solid-state imager includes a rolling shutter to sequentially expose all the image sensors in successive rows or columns over each respective exposure time, and wherein, in the second mode of operation and during the second lighting characteristic, the illuminating light assembly is configured to emit a train of light pulses such that each of the light pulses overlaps two of the second-image frames.

2. The system of claim 1, wherein each of the light pulses overlaps two of the second-image frames such that at least some of the plurality of second images include non-illuminated, non-overlapping portions of the environment.

3. The system of claim 2, wherein the at least some of the plurality of second images the include non-illuminated, non-overlapping portions of the environment are consecutive images.

4. The system of claim 1, wherein during the first lighting characteristic, the illuminating light assembly is configured to emit a pulse of light such that the pulse of light entirely overlaps the respective exposure time of the first-image frame.

5. The system of claim 1, wherein the device detector includes an antenna supported by the housing to receive the RF signal radiated from the mobile communication device when the mobile communication device is searching for a wireless connection to at least one of a Wi-Fi network and a cellular network.

* * * * *